(12) United States Patent
Bettoni et al.

(10) Patent No.: US 9,680,357 B2
(45) Date of Patent: Jun. 13, 2017

(54) METHODS FOR MANUFACTURING ROTORS FOR ELECTRIC MOTORS AND ROTORS MANUFACTURED USING SAID METHODS

(71) Applicant: MAVEL S.r.l., Pont Saint Martin (AO) (IT)

(72) Inventors: Davide Bettoni, Pont Saint Martin (IT); Andrea Bertoldo, Pont Saint Martin (IT)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 707 days.

(21) Appl. No.: 14/031,783

(22) Filed: Sep. 19, 2013

(65) Prior Publication Data

US 2014/0084730 A1 Mar. 27, 2014

(30) Foreign Application Priority Data

Sep. 26, 2012 (IT) ............... MI2012A1606

(51) Int. Cl.
*H02K 15/03* (2006.01)
*H02K 1/27* (2006.01)

(52) U.S. Cl.
CPC .............. *H02K 15/03* (2013.01); *H02K 1/27* (2013.01); *H02K 1/2733* (2013.01); *Y10T 29/49012* (2015.01)

(58) Field of Classification Search
CPC .......... B23K 9/287; H02K 15/03; H02K 1/27; H02K 1/2733; Y10T 29/49012
See application file for complete search history.

(56) References Cited

U.S. PATENT DOCUMENTS

| 2,504,824 | A | | 4/1950 | George | |
|---|---|---|---|---|---|
| 5,185,918 | A | * | 2/1993 | Shafer, Jr. | .......... H02K 15/0012 29/598 |
| 5,208,503 | A | * | 5/1993 | Hisey | ....................... H02K 1/16 310/216.007 |
| 8,614,533 | B2 | * | 12/2013 | Bahadir | ................... H02K 1/26 310/216.058 |

(Continued)

FOREIGN PATENT DOCUMENTS

| EP | 2712061 | * | 9/2016 |
|---|---|---|---|
| GB | 2483967 A | | 3/2012 |

OTHER PUBLICATIONS

Italian Search Report for IT MI2012A001606 dated Jul. 15, 2013.

*Primary Examiner* — Minh Trinh
(74) *Attorney, Agent, or Firm* — Harness, Dickey & Pierce, PLC

(57) ABSTRACT

A method for manufacturing a rotor with permanent magnets may include providing a central core with a desired cross-section; providing a plurality of ferromagnetic discs having a hole shaped in a complementary manner to the cross-section of the central core; stacking up the ferromagnetic discs around the central core to form a cylindrical structure with a longitudinal cavity, wherein the longitudinal cavity is formed by the holes of the stacked-up ferromagnetic discs; integrally blocking together the stacked-up ferromagnetic discs; and removing the central core. A rotor may be manufactured by the method. The rotor may be used in an electric motor.

18 Claims, 2 Drawing Sheets

(56) References Cited

U.S. PATENT DOCUMENTS

| | | | |
|---|---|---|---|
| 2005/0089708 A1* | 4/2005 | Maruko | C22C 45/04 |
| | | | 428/611 |
| 2008/0175978 A1 | 7/2008 | Schuster et al. | |
| 2012/0056503 A1* | 3/2012 | Confalonieri | B21D 28/02 |
| | | | 310/216.009 |
| 2014/0084730 A1* | 3/2014 | Bettoni | H02K 1/27 |
| | | | 310/156.01 |

* cited by examiner

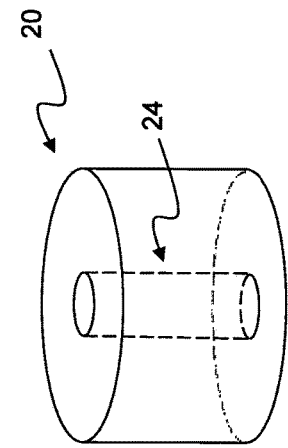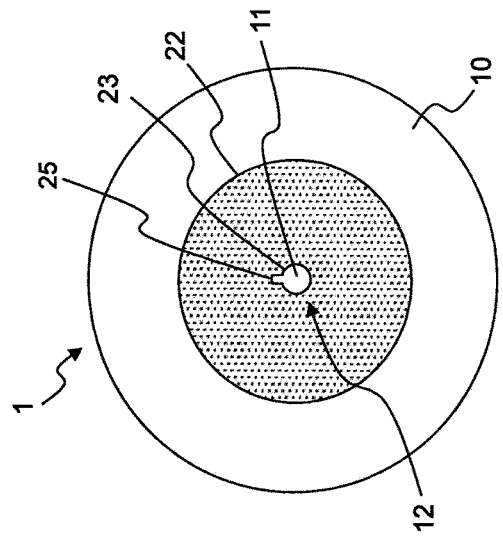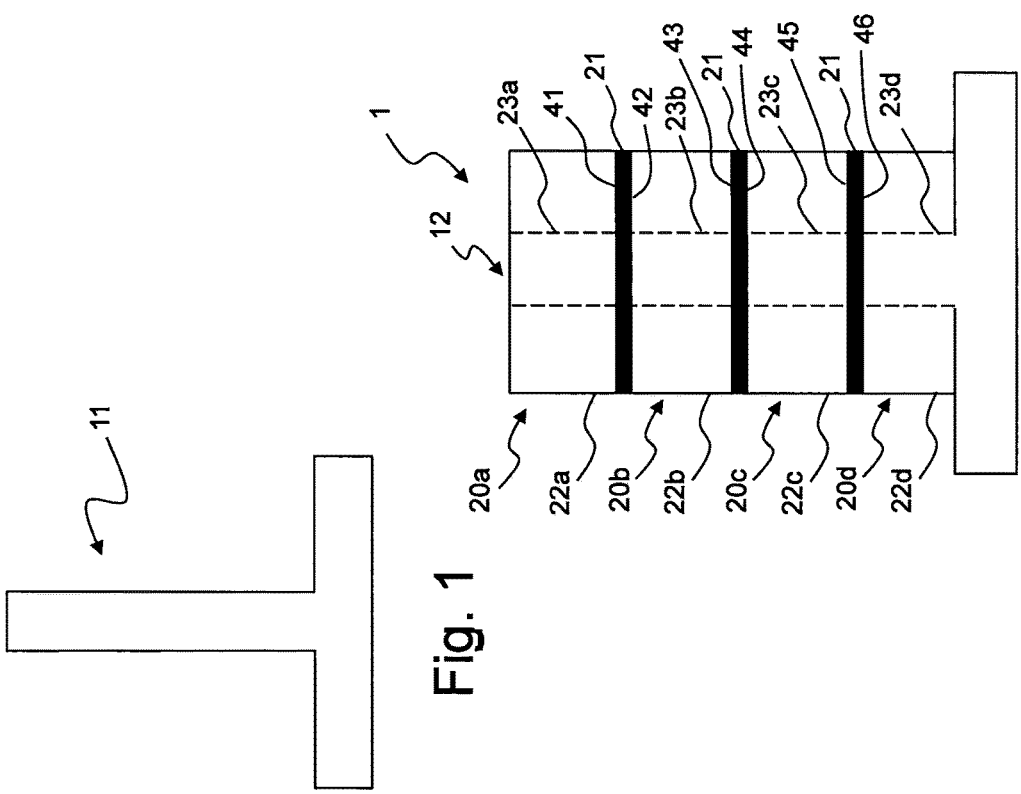

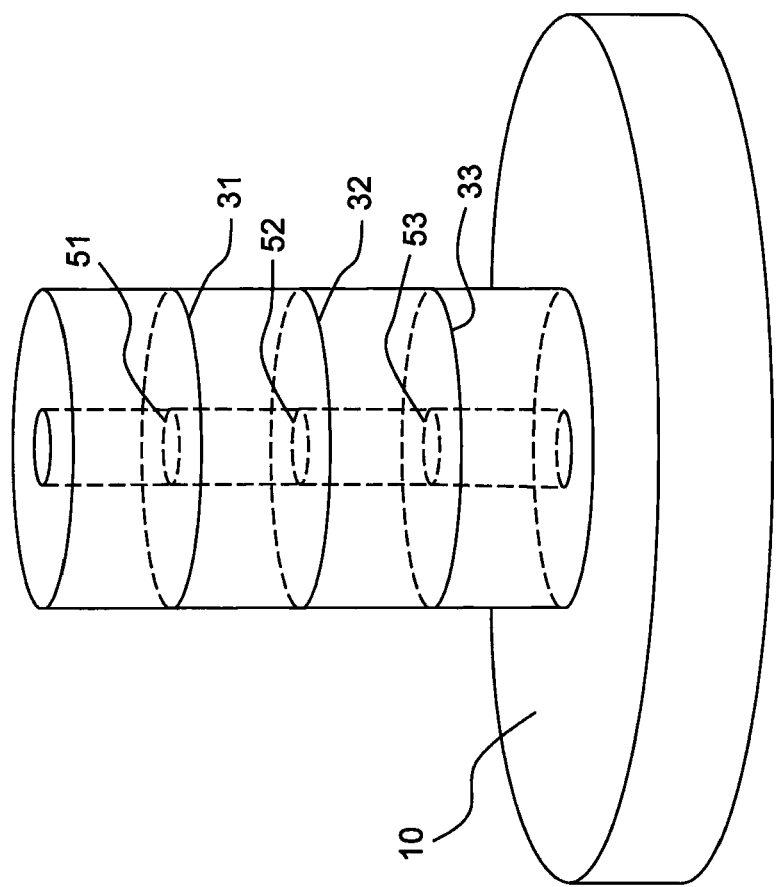

METHODS FOR MANUFACTURING ROTORS FOR ELECTRIC MOTORS AND ROTORS MANUFACTURED USING SAID METHODS

CROSS-REFERENCE TO RELATED APPLICATION(S)

This application claims priority under 35 U.S.C. §119 from Italian Patent Application No. MI2012A 001606, filed on Sep. 26, 2012, in the Italian Patent and Trademark Office, the entire contents of which are incorporated herein by reference.

FIELD OF APPLICATION

The present invention relates to a method for manufacturing a rotor for an electric motor.

More particularly, the present invention relates to a method for manufacturing a rotor for a permanent-magnet, peripheral, high-speed, synchronous electric motor.

The present invention also relates to a rotor manufactured using the aforementioned method.

BACKGROUND

As is well-known, in the electrical engineering sector, the term "rotor" is used to define the drive shaft of an electric motor.

The rotor, in a machine with moving parts, is the set of rotating parts situated opposite the stator which is the stationary part.

Eddy currents are induced on the ferromagnetic rotor of an electric machine which is subject to a variable magnetic field; more specifically superficial circulation currents which are proportional to the dimensions of the rotor and to the square of the frequency—and, therefore, to the speed of rotation of the rotor—are induced.

In a permanent-magnet motor the eddy currents which circulate in the rotor made of ferromagnetic materials result in heating (also locally) of the magnetic material which forms the poles since the magnets constitute an electrically conductive continuum.

Usually the heat present in the rotor is removed owing to a (natural or forced circulation) fluid which flows over the moving parts, ensuring that the temperature of the rotor remains within a certain limit. With an increase in the speed the superficial currents which affect the magnet are considerable and result in significant energy losses and an increase in the temperature of the magnet, considering also that with an increase in the speed of rotation cooling of the rotor becomes gradually more problematic.

In this situation it is possible that the temperature is reached such that the magnetic induction flux tends towards zero, preventing the correct operation of the electric machine; in other words, the electric machine starts to lose efficiency until it stops.

If the temperature rises beyond what is known as the "Curie temperature", the overheating may result in loss of the properties which are typical of magnetic materials which consequently become paramagnetic; in other words, they permanently lose their magnetic properties.

It is possible to reduce the circulating currents (and therefore the dissipation losses) using magnets which are laminated or insulated with respect to each other.

Unfortunately, this solution is not without constructional difficulties.

In fact the rotor produced with insulated laminated magnets is not homogeneous from the point of view of the mass density.

In high-speed applications, i.e. at speeds typically of between 10,000 rpm and 300,000 rpm, this results in non-optimum operation with high losses and low yield, making use of this solution impractical.

The technical problem is to provide a homogeneous magnetic rotor which maintains its homogeneous characteristics also at high speeds, reducing at the same time the eddy currents, so as to overcome the problems of the prior art.

SUMMARY OF THE INVENTION

The present invention provides a method for manufacturing a rotor for electric motors comprising the steps of: providing a central core with a predetermined cross-section; providing a plurality of ferromagnetic discs having a hole shaped in a complementary manner to the cross-section of the central core; stacking up said ferromagnetic discs around said central core, thus forming a cylindrical structure with a longitudinal cavity, wherein said longitudinal cavity is formed by said holes of the stacked-up ferromagnetic discs; integrally locking together said stacked-up discs; and removing the central core.

Preferably it is envisaged performing a step of grinding the outer side surface of said cylindrical structure in order to remove discontinuity between said ferromagnetic discs along the outer circumferential contact profiles of respective pairs of base surface areas.

Preferably it is also envisaged performing a step of grinding the surface of the longitudinal cavity of said cylindrical structure in order to remove discontinuity between said ferromagnetic discs along the inner circumferential contact profiles of said respective base surface areas.

In embodiments it is envisaged performing a step of longitudinally compressing said ferromagnetic discs in order to reduce the spaces between said discs.

The central core may be made of vinyl acetate or polyvinyl acetate. The step of removing the central core could envisage the step of dissolving said core in a solvent fluid, for example ether.

The central core could be advantageously in the form of a sheet rolled up so as to form a substantially cylindrical core.

The method may also comprise the step of arranging an insulating layer between two consecutive stacked-up discs. The insulating layer may be for example a layer of adhesive material.

According to embodiments, it is envisaged providing a stack reference on each of the ferromagnetic discs and/or on the central core in order to stack up the ferromagnetic discs according to a predetermined magnetization direction.

According to embodiments, at least one of the ferromagnetic discs comprises magnetic powders which are isolated from each other.

According to another aspect the present invention relates to a rotor manufactured according to the method described above.

As a result of the outer and inner grinding made possible by the method of the invention, it is possible to provide a homogeneous rotor which takes the form of a homogeneous tubular magnet, but with very small losses due to eddy currents.

BRIEF DESCRIPTION OF THE DRAWINGS

FIG. 1 shows an element associated with the rotor during a step of the method according to the invention;

FIG. 2 shows a rotor during a step of the method according to the invention;

FIGS. 3 and 4 show respectively a side view and a plan view of the rotor during a successive step of the method according to the invention;

FIG. 5 shows a perspective view of the rotor obtained with the method according to the invention.

DETAILED DESCRIPTION

In synchronous electric machines operating at a high speed, namely of between about 10,000 rpm and 300,000 rpm, in particular of the brushless type, the rotor must have specific characteristics which ensure reliable operation thereof.

In fact, defects which in low-speed electric machines may be considered negligible, such as slight asymmetry of the rotor or machining residue on the side surface of the rotor, in high-speed electric machines may cause serious malfunctioning or irreparable damage. For example an imbalance of 1 mg on the surface of the rotor, which results In an albeit slight asymmetry thereof, may cause non-efficient operation of the machine, with the result that it is not possible to reach the high speeds required.

A permanent-magnet rotor, according to the invention is made by stacking up ferromagnetic discs using a central core (or spindle) in order to form a hollow cylindrical structure which forms the rotor itself; by means of compression of these discs and grinding of the outer and inner surfaces of this cylindrical structure it Is possible to generate a homogeneous and axially symmetrical rotor.

With particular reference to the figures, FIG. 1 shows a spindle 11 (also called "central core" in the claims) designed so as to be able to receive, fitted thereon, suitably configured elements, for example discs with holes which are compatible in terms of hole size with the diameter of the aforementioned spindle 11.

The spindle 11 is preferably associated with a base 10 configured to keep the spindle itself in an erect position.

The spindle 11 and consequently a step for providing the same according to the invention is shown in FIG. 1.

FIG. 2 shows a ferromagnetic disc 20 comprising a through-hole 24 in its centre.

In order to produce the rotor 1 according to the invention, a plurality of ferromagnetic discs 20, indicated in the following figures by the reference numbers 20a, 20b, 20c, 20d, are prepared for subsequent use.

According to the invention the hole 24 has a diameter which is compatible with the cross-section of the spindle 11 so that the ferromagnetic discs may be fitted onto the spindle.

With particular reference to FIGS. 3, 4 and 5, the ferromagnetic discs 20a, 20b, 20c, 20d are fitted onto the spindle 11 thereby resulting in a cylindrical structure with cavity 12; the cavity 12 is formed by the longitudinal arrangement, next to each other, of the aforementioned single holes 24.

In other words, laminations of ferromagnetic material are arranged around the spindle 11, forming the cylindrical structure of the rotor 1.

In high-speed applications, the objectives identified consist in the small physical size (volume) together with a high available power.

It is therefore of fundamental importance to reduce the losses due to eddy currents which are independently generated and result in a deterioration in the performance of the motor until the required electromagnetic characteristics are lost.

In order to reduce the eddy currents to a minimum, it is attempted to limit recirculation thereof in the magnetic element (rotor).

Advantageously, according to the invention, an insulating layer 21 (FIG. 3) is provided between each pair of ferromagnetic discs 20a, 20b, 20c, 20d so as to prevent circulation of eddy currents between the discs.

With reference to FIG. 3, it should be noted that the thickness of the insulating layer 21 has been deliberately accentuated so that it may be more readily visible; moreover the figure is not shown to scale since, preferably, the thickness of this insulation varies roughly between 2 μm and 6 μm, while the thickness of an electromagnetic disc varies between fractions of a mm and a few mm.

Preferably, the insulating layer 21 is a layer of adhesive material.

The insulating layer 21 may be made with a suitable resin, glue or paint having insulating characteristics.

The ferromagnetic discs 20a, 20b, 20c, 20d provided on the spindle 11 and insulated by means of the insulating layer 21 are then compressed so as to create a cylindrical structure in which the circulation of eddy currents is reduced to a minimum.

In other words, the method according to the invention envisages bonding the ferromagnetic discs 20a, 20b, 20c, 20d on a special spindle in order to reduce the spaces between them and ensure that the resultant rotor is as homogeneous as possible.

In certain embodiments, the spindle and/or each single disc has a reference element. For example, the spindle may be provided with a tooth 25 (shown only in FIG. 4) protruding radially outwards a certain distance in the longitudinal direction. Correspondingly, each single disc may be shaped with a recess which complements the tooth 25. In this way all the discs are stacked up ensuring the same and precise direction of magnetization.

In other words, this tooth 25 allows arrangement of the ferromagnetic discs 20a, 20b, 20c, 20d according to their magnetic orientation (spin); each ferromagnetic disc 20a, 20b, 20a, 20d has in fact a preferential magnetization direction.

In order to make the rotor as homogeneous the invention envisages grinding the outer side surface 22a, 22b, 22c, 22d of the cylindrical structure 1.

With particular reference to FIGS. 3 and 4, preferably grinding is performed along the outer circumferential contact profiles of pairs of base surfaces 41,42; 43,44; 45,46 of the ferromagnetic discs 20a,20b,20c,20d.

Once outer grinding has been completed, the spindle 11 is removed.

In other words, the presence of the spindle 11 ensures positioning of the ferromagnetic discs and their stability during the important outer grinding operation; once it has completed its function, it may be removed.

Removal of the spindle 11 is performed by means of extraction of the spindle 11 from the cavity 12 by means of melting thereof.

According to a preferred embodiment of the invention, the spindle 11 is made of vinyl acetate or polyvinyl acetate.

According to a preferred embodiment of the invention, removal of the spindle 11 made of acetate is performed by dipping it and the cylinder 1 in a fluid which is able to dissolve the spindle. For example, in the case of vinyl acetate and polyvinyl acetate, the spindle may be dipped in ether, with consequent dissolving of the spindle 11.

According to a further embodiment, the spindle 11 is made of teflon.

Once the spindle 11 has been removed, the surface of the cavity 12 remains free and may undergo treatment in order to make this part as homogeneous as possible.

According to the invention, while keeping the rotor locked in position by means of clamping of its outer side surface, a step for manufacturing the rotor 1 envisages grinding the surface of the cavity 12 of the cylindrical structure 1 in order to eliminate discontinuity between said ferromagnetic discs 20a, 20b, 20c, 20d.

In other words it is envisaged performing grinding along inner circumferential contact profiles of the respective base surface areas 41,42; 43,44; 45,46 of the ferromagnetic discs 20a,20b,20c,20d.

The effect achieved is a substantial homogeneity both of the cavity 12 and of the outer side surface 22a, 22b, 22c, 22d of the rotor 1.

Manufacture of the rotor according to the invention comprises a last step in which the ferromagnetic discs 20a, 20b, 20c, 20d are magnetized in order to provide a rotor 1 with magnetic characteristics.

At the end of the procedure for manufacturing a rotor 1 according to the invention, the rotor 1 comprises:
magnetized ferromagnetic discs 20a, 20b, 20c, 20d;
insulating layer and adhesive 21 arranged between each pair of discs.

According to the invention, the ferromagnetic discs 20a, 20b, 20c, 20d and the layer 21 are configured to be compressed, in accordance with that shown in the method of the invention, and the inner and outer side surfaces are configured to be ground so as to make the rotor as homogenous as possible.

According to advantageous embodiments of the invention, the rotor is constructed using magnetic powders which are insulated from each other. For example it is possible to envisage discs of infinite thickness (of the order of a few microns, up to a few millimeters) composed of concentric layers of magnet of infinite thickness. Basically, advantageously, a magnet which has already has intrinsically insulation between the powders is constructed.

By way of conclusion, according to the invention, by using insulated magnets it is possible to reduce the eddy currents of the ferromagnetic material and therefore limit the consequent losses. The process of laminating the magnets using an insulating glue allows the circulation currents in the magnets to be limited to the high frequencies (the losses are proportional to the frequency) so as to reduce the eddy currents. The possibility, arising from this constructional mode, of being able to grind both the inner part and the outer part of the cylinder consisting of magnetic "washers" improves and simplifies the rotor balancing step.

The invention therefore achieves the major advantage of providing a rotor which is axially symmetrical and homogeneous and particularly suitable for application to high-speed electric motors.

The invention claimed is:

1. A method comprising:
providing a central core having a particular cross-section;
providing a plurality of ferromagnetic discs having a hole shaped in a complementary manner to the particular cross-section of the central core;
stacking the plurality of ferromagnetic discs around the central core to form a cylindrical structure having a longitudinal cavity, wherein the longitudinal cavity is defined by the holes of the stacked ferromagnetic discs;
integrally blocking together the stacked ferromagnetic discs; and
grinding an outer side surface of the cylindrical structure to remove discontinuities among the plurality of ferromagnetic discs at outer circumferential contact profiles of pairs of base surface areas of the plurality of ferromagnetic discs.

2. The method of claim 1, further comprising:
longitudinally pressing the plurality of ferromagnetic discs to reduce spaces among the plurality of ferromagnetic discs.

3. The method of claim 1, further comprising:
removing the central core;
wherein the central core is made of vinyl acetate or polyvinyl acetate, and
wherein the removing the central core includes dissolving the central core in solvent fluid.

4. The method of claim 3, wherein the central core includes a rolled sheet that defines a substantially cylindrical core.

5. The method of claim 3, wherein the solvent fluid includes ether.

6. The method of claim 1, further comprising:
arranging an insulating layer between two consecutively stacked ferromagnetic discs;
wherein the insulating layer includes an adhesive material.

7. The method of claim 1, further comprising:
providing a stack reference on each of the plurality of ferromagnetic discs or on the central core to stack the plurality of ferromagnetic discs according to a particular magnetization direction.

8. The method of claim 1, wherein at least one of the plurality of ferromagnetic discs includes one or more magnetic powders that are isolated from each other.

9. The method of claim 1, further comprising:
longitudinally pressing the plurality of ferromagnetic discs to reduce spaces between the plurality of ferromagnetic discs.

10. The method of claim 1, wherein the central core includes vinyl acetate or polyvinyl acetate.

11. The method of claim 1, further comprising:
arranging an insulating layer between two consecutively stacked ferromagnetic discs.

12. The method of claim 1, further comprising:
arranging an insulating layer and adhesive material between two consecutively stacked ferromagnetic discs.

13. The method of claim 1, further comprising:
providing a stack reference on each of the plurality of ferromagnetic discs and on the central core to stack the plurality of ferromagnetic discs according to a particular magnetization direction.

14. The method of claim 1, wherein at least one of the plurality of ferromagnetic discs includes one or more magnetic powders that are insulated from each other.

15. A method, comprising:
providing a central core having a particular cross-section;
providing a plurality of ferromagnetic discs having a hole shaped in a complementary manner to the particular cross-section of the central core;
stacking the plurality of ferromagnetic discs around the central core to form a cylindrical structure having a longitudinal cavity, wherein the longitudinal cavity is defined by the holes of the stacked ferromagnetic discs;
integrally blocking together the stacked ferromagnetic discs; and removing the central core, wherein the removing the central core includes dissolving the central core using solvent fluid.

16. The method of claim 15, wherein the solvent fluid includes ether.

17. The method of claim 15, wherein the central core is made of vinyl acetate or polyvinyl acetate.

18. A method comprising:

providing a central core having a particular cross-section;

providing a plurality of ferromagnetic discs having a hole shaped in a complementary manner to the particular cross-section of the central core;

stacking the plurality of ferromagnetic discs around the central core to form a cylindrical structure having a longitudinal cavity, wherein the longitudinal cavity is defined by the holes of the stacked ferromagnetic discs;

integrally blocking together the stacked ferromagnetic discs; and grinding a surface of the longitudinal cavity of the cylindrical structure to remove discontinuities among the plurality of ferromagnetic discs at inner circumferential contact profiles of base surface areas of the plurality of ferromagnetic discs.

\* \* \* \* \*

UNITED STATES PATENT AND TRADEMARK OFFICE
CERTIFICATE OF CORRECTION

| | | |
|---|---|---|
| PATENT NO. | : 9,680,357 B2 | Page 1 of 1 |
| APPLICATION NO. | : 14/031783 | |
| DATED | : June 13, 2017 | |
| INVENTOR(S) | : Davide Bettoni et al. | |

It is certified that error appears in the above-identified patent and that said Letters Patent is hereby corrected as shown below:

On the Title Page

Item (30) should read:
(30) Foreign Application Priority Data
Sep. 26, 2012 (IT)...... MI2012A001606

Signed and Sealed this
Twenty-fourth Day of April, 2018

Andrei Iancu
*Director of the United States Patent and Trademark Office*